Nov. 28, 1933.  J. M. SWAIN  1,936,776

WINDSHIELD WARMER AND VENTILATOR

Filed June 1, 1931

Inventor
Joseph M. Swain
By Liverance
and Van Antwerp
Attorneys

Patented Nov. 28, 1933

1,936,776

UNITED STATES PATENT OFFICE 1,936,776

WINDSHIELD WARMER AND VENTILATOR

Joseph Milton Swain, Mount Pleasant, Mich.

Application June 1, 1931. Serial No. 541,133

1 Claim. (Cl. 20—40.5)

The present invention relates to improvements in condensation prevention means and has reference more particularly to an attachment on an automobile for preventing the accumulation of snow, ice, sleet or the like upon the windshield whereby the operation of the usual windshield wiper will not be affected.

More particularly, the present invention aims to direct a blast of warm air against the inner face of the windshield, whereby, as above set forth, the windshield will be slightly heated thereby eliminating snow and the like therefrom, and furthermore the movement of the warm air upwardly through the center portion of the space between the instrument board and the windshield will also cause a draft or current of air from the body of the automobile to flow underneath the instrument board and upwardly behind the same on either side of the flared nozzle member which acts in ejector-like fashion. Hence, not only will the warm air from above the engine flow upwardly over the innerside of the windshield but the air from the car will also be drawn thereover. Thus a continuous circulation is established within the body of the automobile which not only maintains the windshield free from condensation but also tends to maintain the windows in the body free from condensation. Also, the temperature within the body is kept at an even temperature.

It is also to be noted that my novel installation is readily adapted to be applied to the modern type of automobile, that is, those equipped with a combined instrument board and deflector which extends upwardly behind the lowermost portion of the windshield, so that when the windshield is raised to its upper position, the air from the outside of the automobile will be thrown downwardly under the driver's seat. However, the windshield is adapted to be maintained in its lowered and closed position during the operation of my combined heating and ventilating device.

Another advantage residing in my attachment lies in its ease of installation. The installation is accomplished by merely drilling a hole through the dash board and then inserting the warm air conveying tube therethrough and forcing the flared nozzle between the instrument board and the underside of the cowl. Then, if desired, the dash control for the butterfly valve in the tube is installed.

Other objects and advantages of the present invention will become apparent from the following description when taken in connection with the accompanying drawing.

In the accompanying drawing wherein like reference characters indicate corresponding parts throughout the several views.

Similar numerals refer to similar parts throughout the several views.

Figure 1:
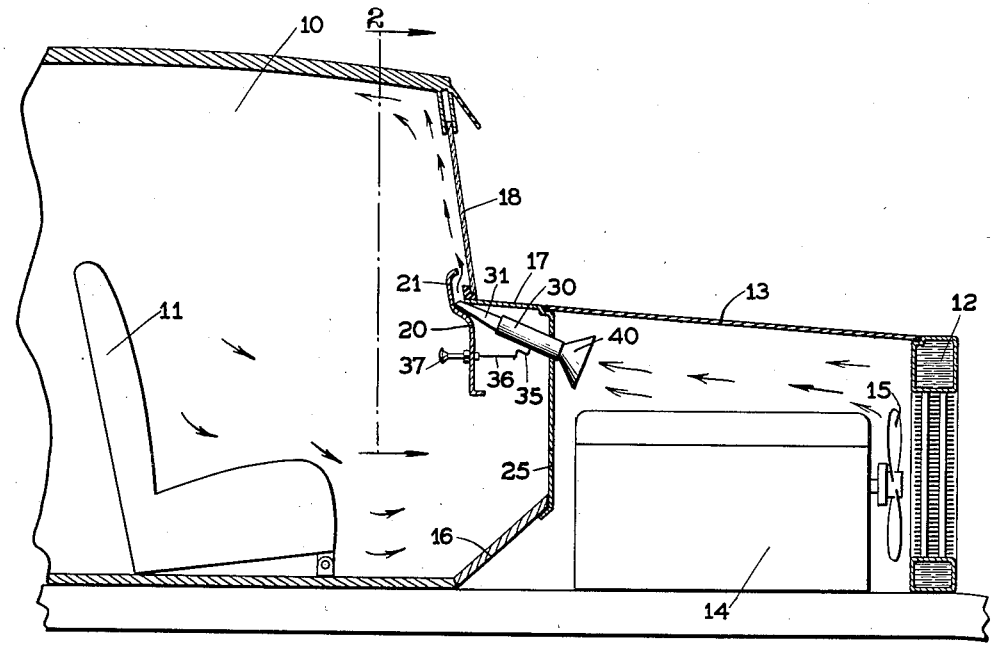
Fig. 1 is a view in cross section taken longitudinally through an automobile body, my improved heating and ventilating device being installed therein.
Figure 2:
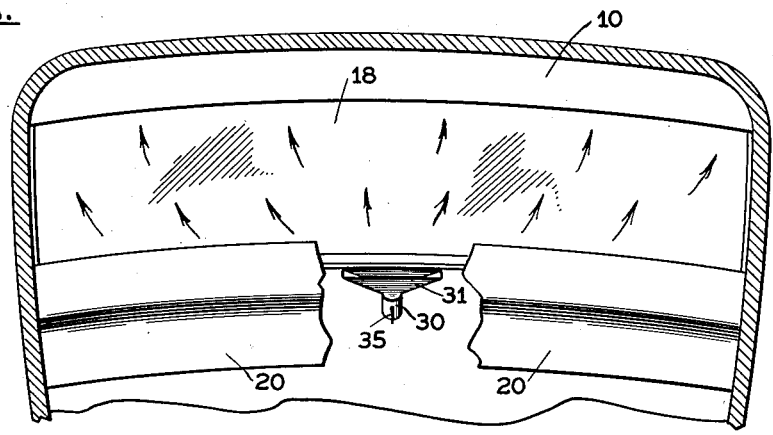
Fig. 2 is a view taken along the plane of the line 2—2 of Fig. 1, parts of the instrument and deflector board being broken away in order to better illustrate my invention.

Referring to Figs. 1 and 2 particularly, 10 designates the body of the usual automobile, this body having the usual seat 11 therein. A radiator 12 is located as shown and the hood 13 extends back over the engine 14, the engine driving the usual fan 15, and being separated from the interior of the body member 10 by the dash board 25 and the floor board 16.

The dash board 25 merges into a cowl 17 and a vertically movable windshield 18 is mounted between the cowl 17 and the body member 10 in the usual manner.

An instrument board 20 is spaced rearwardly from the windshield and has a deflector portion 21 which extends upwardly back of and curves inwardly toward the windshield. This is the typical construction of certain types of present day automobiles.

Figure 3:
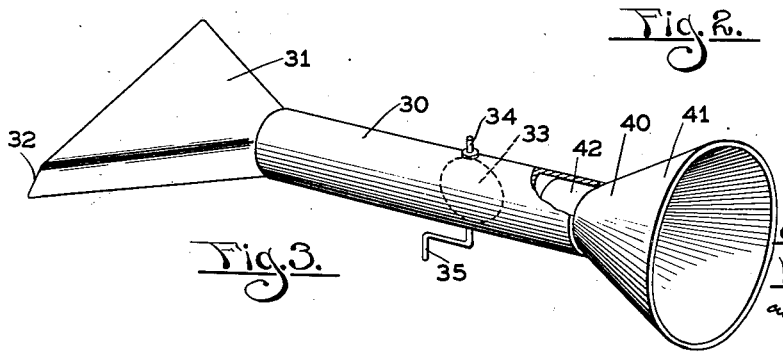
Fig. 3 is a perspective view disclosing the preferred form of my invention.

Referring now to Fig. 3, 30 designates a cylindrical tube which has a tapered flared nozzle 31 connected at one end thereof. The end of this nozzle 31 is cut at a slight angle as indicated at 32 in order that space may be had for the passage of air even if the nozzle is thrust against the instrument board. However the flared nozzle is normally wedged into its fixed position between the inner side of the instrument board and the underside of the cowl, see Fig. 1, and hence the exact shape of the end of the nozzle is immaterial.

The cylindrical tube 30 is equipped with a butterfly valve 33 and rod 34 extends through the tube 30 to provide a mounting for the valve 33. The rod 34 is bent to form a crank portion as indicated at 35 whereby the valve may be regulated to either closed or open position or to any intermediate position as desired. A funnel shaped member 40 is adjustably and slidably received into the other end of the tube 30. The funnel shaped member 40 has a bell shaped end 41 and a cylindrical tube shaped end 42. The tube 42 fits inside of the tube 30 thus allowing the heating unit to be adjusted in length as desired.

The bell shaped portion, see Fig. 1, is adapted to catch the air which is blown rearwardly over the engine 14 by means of the fan 15. This air passes through the tube 30, then outwardly and upwardly through the flared nozzle 31 and is deflected inwardly against the windshield 18 by means of the deflector portion 21. Thus the deflector portion 21 is made to serve a dual purpose. When my device is in operation it serves as aforesaid and in the summer time when the windshield is raised the deflector portion 21 serves to divert the air inwardly and downwardly under the instrument board in the usual fashion.

As shown in Fig. 1 the crank arm 35 may be controlled by means of the control rod 36 operated by the button 37 in a manner well understood by those skilled in this art.

From the above description it will be appreciated that I have inventively created a very simple device which may be easily installed upon the present day type of automobile and which will operate not only to throw a small body of heated air but will also act in a fashion to move the air adjacent to the nozzle. Thus the entire space within the car is ventilated.

I claim:

In an automobile having a windshield, an instrument board spaced from said windshield on its rear side and a dash board below and in front of the windshield, the combination of a nozzle member extending between the windshield and the instrument board and only filling a fraction of the space therebetween, and adjustable length means extending from the nozzle member through the dash board whereby air is taken from the space in front of the same and supplied to the nozzle member, said adjustable length means terminating in a relatively large funnel means adapted to receive air from the fan of the automobile engine when the same is operating and additional air from the speed of the car when the same is in motion whereby air from the interior of the car is caused to circulate upwardly on either side of the said nozzle member.

JOSEPH MILTON SWAIN.